March 16, 1948. T. KNOX 2,438,011
SHOCK ABSORBING STRUT FOR AIRCRAFT
Filed May 1, 1945 2 Sheets-Sheet 1

INVENTOR
Thomas Knox
BY
Pennie Davis Marvin & Edmonds
ATTORNEYS

March 16, 1948.  T. KNOX  2,438,011
SHOCK ABSORBING STRUT FOR AIRCRAFT
Filed May 1, 1945  2 Sheets-Sheet 2
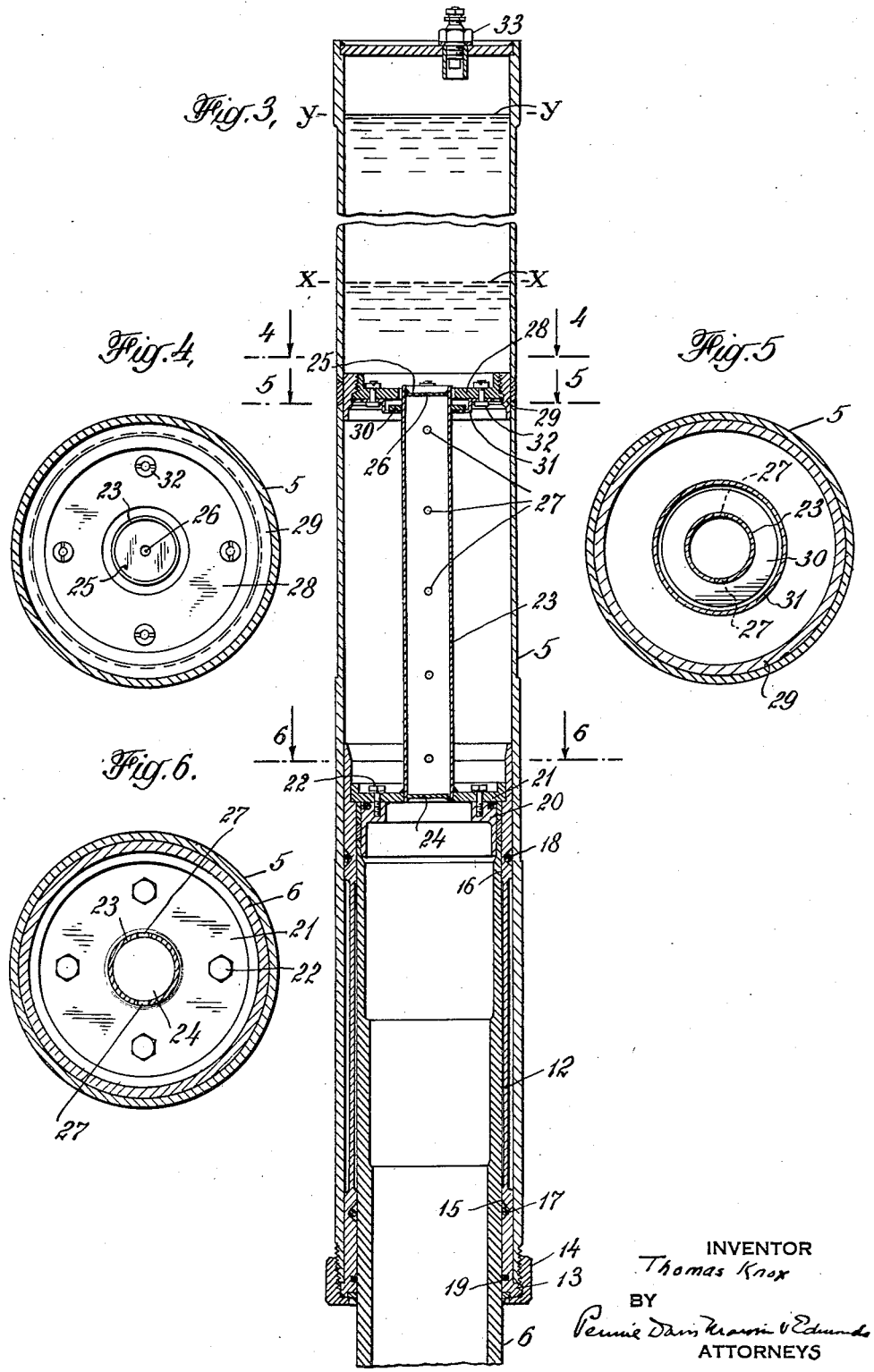
INVENTOR
Thomas Knox
BY
ATTORNEYS Patented Mar. 16, 1948

2,438,011

UNITED STATES PATENT OFFICE 2,438,011

SHOCK ABSORBING STRUT FOR AIRCRAFT

Thomas Knox, Newtown, Pa., assignor, by mesne assignments, to Kaiser Fleetwings, Inc., a corporation of California Application May 1, 1945, Serial No. 591,389

8 Claims. (Cl. 267—64)

1

This invention relates to shock absorbing struts for aircraft and particularly to an improved construction adapted to absorb a major portion of the forces to which the landing wheels of the aircraft are subjected in landing.

Shock absorbing struts as heretofore constructed have required an excessive amount of machining to ensure smooth and satisfactory operation. Such machine work is relatively slow and expensive and introduces serious delay in the fabrication and delivery of finished parts for essential aircraft.

It is the object of the present invention to provide a substantial and satisfactory shock absorbing strut which can be assembled with a minimum of machine work requiring close limits.

Another object of the invention is the provision of a shock absorbing strut of novel construction, affording more satisfactory operation and other improved operating advantages.

Other objects and advantages of the invention will be apparent as it is better understood by reference to the following specification and the accompanying drawing, in which Fig. 1 is an elevation, partially in section, illustrating the strut;

Fig. 3 is an enlarged longitudinal section through a portion of the strut;

Fig. 4 is a section on the line 4—4 of Fig. 3;

Fig. 5 is a section on the line 5—5 of Fig. 3; and

Fig. 6 is a section on the line 6—6 of Fig. 3.

Figure 1:
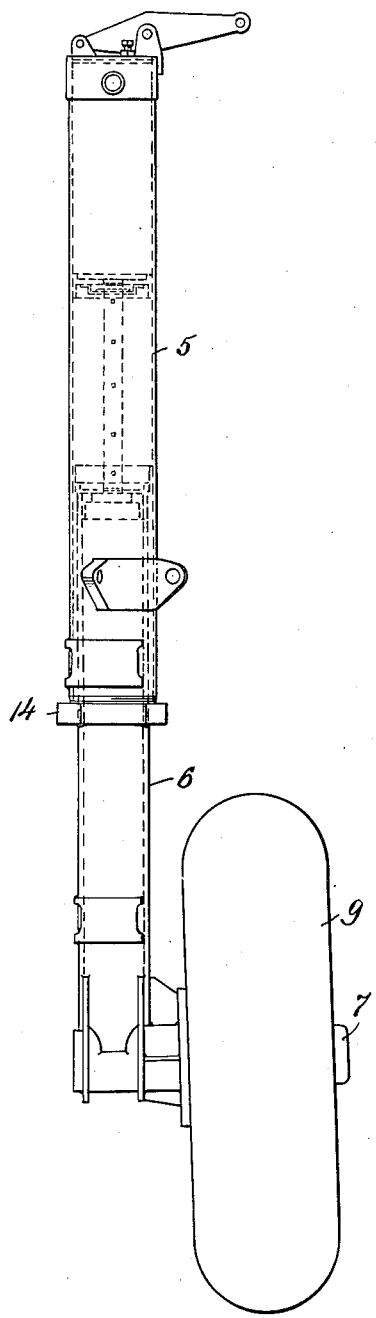

Referring to the drawing, the strut comprises an outer cylinder 5 and an inner cylinder 6 arranged in telescoping relation. The cylinder 6 is provided with an axle 7 to receive a wheel 8 carrying a tire 9. A nut cracker comprising pivoted arms 10 and 11 connects the cylinders 5 and 6 to maintain them in proper alignment.

The cylinder 5 is provided at its lower end with a bushing 12 having an abutment 13 at its lower end engaging the end of the cylinder 5. A nut 14 secures the parts in assembled relation. Aligned bearing surfaces 15 and 16 are formed in the bushing 12 which may be fabricated of any suitable metal, preferably bronze. The bearing surfaces 15 and 16 are machined to a relatively close fit with the outer surface of the cylinder 6 which engages the bearing surfaces. These surfaces are the only parts of the structure which require careful machining within close limits, and consequently the structure can be produced at less cost than shock absorbing struts such as have been employed heretofore in aircraft construction. Doughnut packing 17 and 18 may be provided at convenient points to prevent leakage of oil, and a wiper 19 of felt or other suitable material is preferably provided to insure lubrication on the outer surface of the cylinder 6.

At the upper end of the cylinder 6, a ring 20 is secured and a head 21 is fastened to the ring by bolts 22. A tube 23 is welded or otherwise secured to the head 21. The tube is closed at its lower end by a plug 24, and at its upper end by a plug 25 having a metering orifice 26. A plurality of metering orifices 27 are provided in the wall of the tube 23 in longitudinally spaced relation. The tube 23 projects slightly through an opening in a diaphragm 28 threadedly mounted in a ring 29 which is secured to the wall of the tube 5. The opening surrounding the tube 23 is of considerably greater diameter to permit the free flow of oil. A flap valve in the form of an annulus 30 is supported in a cage 31 secured by bolts 32 to the diaphragm 28 and in the position indicated in Fig. 3 permits oil to flow from the upper part of the cylinder 5 into the lower part thereof, during the extension stroke; and provides a relatively unrestricted passageway through the diaphragm 28 when the shock absorber is inactive.

The cylinder 5 is adapted to be filled with oil to approximately the level $x$—$x$, the remainder of the space above the oil containing a gaseous medium such as air under pressure which is introduced through a valve 33. The valve may be similar to the "Schrader" valve commonly employed in automobile tires, and the gaseous pressure may be such as to afford the desired cushioning effect. It will vary depending upon the size of the strut and the load to which it is subjected.

Figure 2:
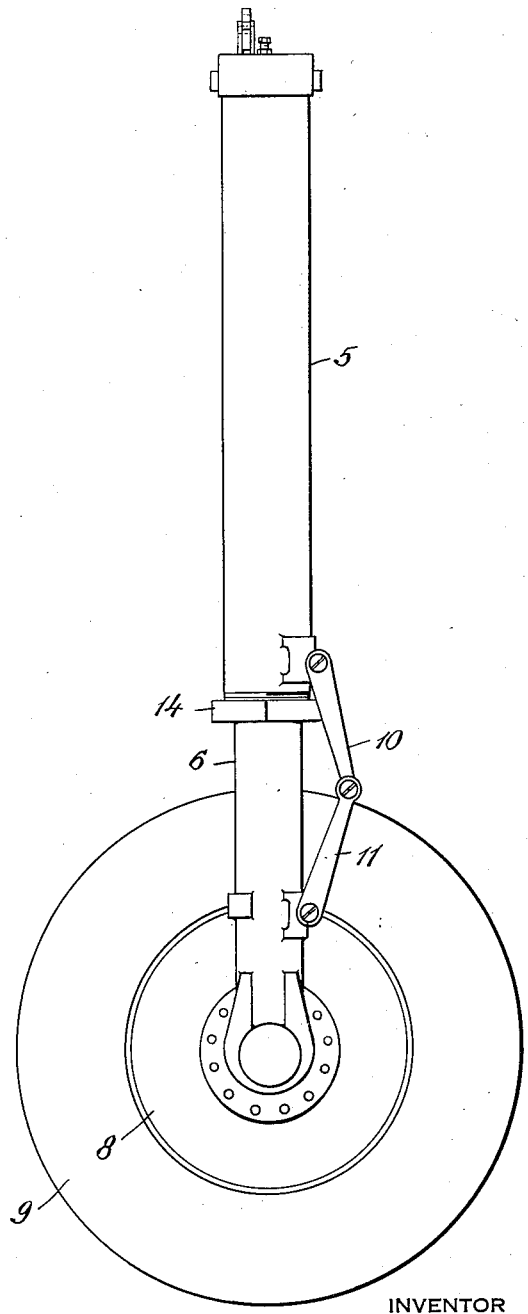
Fig. 2 is an elevation of the structure illustrated in Fig. 1.

Normally when no weight is resting on the tires 9, the strut is extended with the parts in the positions indicated in full lines in Figs. 1 and 2. When the aircraft lands and the weight plus the dynamic load thereof is carried by the tires 9, the cylinders 6 of each of the struts with which the aircraft is provided will be moved inwardly. During this movement, the cylinders 6, including the parts attached thereto, will telescope with the cylinders 5. The pressure thus developed will cause the flap valve 30 in each strut to move upwardly, thus closing the opening surrounding the tube 23. Thereafter the oil is forced through the metering openings 27 into the tube 23 and out through the metering opening 26 into the upper part of the cylinder 5.

It will be noted that in the initial operation the movement of oil into the upper part of the cylinder 5 is necessarily limited by the necessity of flowing through the metering opening 26. As soon as the uppermost metering opening 27 has passed the diaphragm 28, the flow of oil into the upper part of the cylinder 5 is increased to the extent provided by this additional outlet. The flow is further increased when the second uppermost metering opening 27 passes the diaphragm 28, and as each successive metering opening 27 rises above the level of the diaphragm, until toward the end of the stroke all of the oil passing into the tube 23 must enter through the lowermost metering opening 27, effectually checking the relative movement of the cylinders 5 and 6. Hence there is a relatively slow movement, then an accelerated movement which eventually is retarded again before the stroke is completed. At this point, the oil level may be approximately that indicated at y—y, and the gaseous medium is compressed to the limited space above the oil level. The landing shock is thus readily absorbed.

When the airplane again leaves the ground, the gaseous medium at the top of the cylinder 5 which has been highly compressed and the weight of the wheels 8 and the tires 9 and of the cylinder 6, will cause the cylinder 6 to withdraw from the cylinder 5. The tendency of the cylinder 6 to drop causes a pressure which unseats the flap valve 30 and allows the oil to flow rapidly through the opening surrounding the tube 23 as well as in a reverse direction through tube 23. The oil is thus returned to the lower part of the cylinder 5, and the strut is ready to absorb the next shock if the airplane wheels 9 again touch the ground.

The structure as described affords a relatively inexpensive and practical shock absorbing strut, the movement of which is controlled during the compression stroke by the restriction of movement of the liquid and the effect of the gaseous medium under pressure above the liquid. The extension is rapid, due to the relief of restriction provided by flap valve 30, and is adequately controlled by the energy absorption during the reverse flow through metering tube 23. The structure has numerous advantages over devices heretofore used for the purpose, particularly those requiring so-called "bulb type" metering pins. The latter require costly grinding to very close tolerance, and the structure, though capable of satisfactory performance, is relatively costly as compared with the simplified structure described herein. It is a relatively simple matter to properly align the bearings 15 and 16 of the bushing 12 and to finish the outer surface of the cylinder 6, thus ensuring smooth operation. The other parts of the device are readily constructed and assembled, and the relative sizes and positions of the metering openings 26 and 27 can be determined readily to secure most effective operation.

Various changes may be made in the form, arrangement and construction of the parts without departing from the invention or sacrificing the advantages thereof.

I claim:

1. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices, the uppermost orifice being in the otherwise closed upper end of the metering tube and communicating directly with the space above the diaphragm when the strut is extended, and a valve associated with the diaphragm and adapted to seal and unseal the opening about the tube as the latter moves inwardly and outwardly with respect to the outer cylinder.

2. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices, the uppermost orifice communicating with the space above the diaphragm when the strut is extended, and a valve associated with the diaphragm and adapted to seal and unseal the opening about the tube as the latter moves inwardly and outwardly with respect to the outer cylinder, the spacing of the metering orifices being such that relative movement of the cylinders is first retarded, then accelerated, and finally retarded on the inward stroke as successive metering orifices pass the diaphragm.

3. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder closed at its lower end and having a plurality of longitudinally spaced metering orifices, the uppermost orifice being in the otherwise closed upper end of the metering tube and communicating directly with the space above the diaphragm when the strut is extended, and a flap valve associated with the diaphragm and adapted to seal and unseal the opening about the tube as the latter moves inwardly and outwardly with respect to the outer cylinder.

4. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices and a plug at its upper end with a metering orifice communicating with the space above the diaphragm when the strut is extended and a valve associated with the diaphragm and adapted to seal and unseal the opening about the tube as the latter moves inwardly and outwardly with respect to the outer cylinder.

5. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices and a plug at its upper end with a metering orifice communicating with the space above the diaphragm when the strut is extended and a cage and flap valve associated with the diaphragm and adapted to seal and unseal the opening about the tube as the latter moves inwardly and outwardly with respect to the outer cylinder.

6. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices and a plug at its upper end with a metering orifice communicating with the space above the diaphragm when the strut is extended and a valve associated with the diaphragm and adapted to seal and unseal the opening about the tube as the latter moves inwardly and outwardly with respect to the outer cylinder, the spacing of the metering orifices being such that relative movement of the cylinders is first retarded, then accelerated, and finally retarded on the inward stroke as successive metering orifices pass the diaphragm.

7. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices, the uppermost orifice being in the otherwise closed upper end of the metering tube and communicating directly with the space above the diaphragm when the strut is extended, a valve associated with the diaphragm and adapted to seal and unseal the opening about the tube as the latter moves inwardly and outwardly with respect to the outer cylinder, and a bushing having spaced aligned bearing surfaces secured within the lower end of the outer cylinder, the outer surface of the inner cylinder being finished to engage and travel smoothly over the bearing surfaces.

8. A shock absorbing strut for aircraft comprising telescoping cylinders, the outer cylinder being partially filled with a liquid, a diaphragm in the outer cylinder having an opening, a metering tube of lesser diameter than the opening secured to the inner cylinder and having a plurality of longitudinally spaced metering orifices, the uppermost orifice being in the otherwise closed upper end of the metering tube and communicating directly with the space above the diaphragm when the strut is extended, and a valve associated with the diaphragm and adapted to seal and unseal the opening about the tube as the latter moves inwardly and outwardly with respect to the outer cylinder, the outer cylinder having a gas chamber above the diaphragm and valve means for holding gas under pressure in the chamber.

THOMAS KNOX.

REFERENCES CITED

The following references are of record in the file of this patent:

UNITED STATES PATENTS

| Number | Name | Date |
|---|---|---|
| 1,759,674 | Wallace | May 20, 1930 |
| 1,750,531 | Messier | Nov. 4, 1930 |
| 2,101,265 | Mercier | Dec. 7, 1937 |
| 2,196,068 | Greve | Apr. 2, 1940 |
| 2,357,505 | Crispell | Sept. 5, 1944 |
| 2,378,712 | Laraque | June 19, 1945 |
| 2,396,318 | DeBell | Mar. 12, 1946 |

FOREIGN PATENTS

| Number | Country | Date |
|---|---|---|
| 782,123 | France | Mar. 11, 1935 |